J. LINES.
VALVE.
APPLICATION FILED OCT. 18, 1897.
1,226,608.
Patented May 15, 1917.
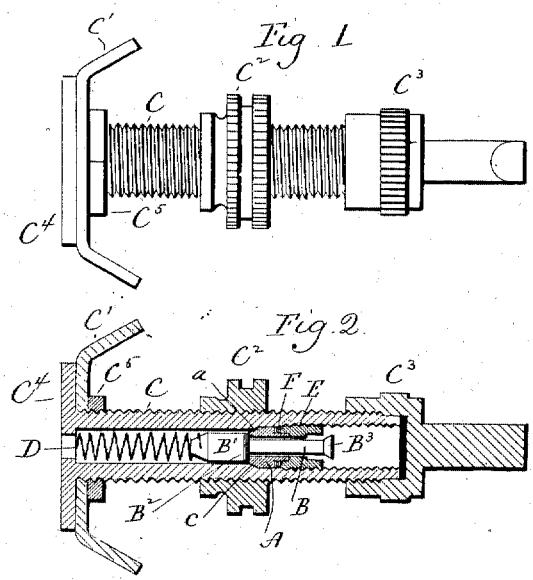
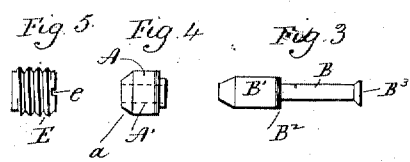

UNITED STATES PATENT OFFICE.

JOHN LINES, OF WATERBURY, CONNECTICUT, ASSIGNOR TO THE SCOVILL MFG. CO., OF WATERBURY, CONNECTICUT.

VALVE.

1,226,608.  Specification of Letters Patent.  Patented May 15, 1917.

Application filed October 18, 1897. Serial No. 655,516.

*To all whom it may concern:*

Be it known that I, JOHN LINES, of Waterbury, in the county of New Haven and State of Connecticut, have invented a new Improvement in Valves; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a valve constructed in accordance with my invention.

Fig. 2, a view thereof in longitudinal central section.

Fig. 3, a detached view of the valve and valve-stem.

Fig. 4, a similar view of the valve-seat.

Fig. 5, a similar view of the plug.

Fig. 6, a detached view in longitudinal section of one of the modified forms which my improvement may assume.

My invention relates to an improvement in that class of valves primarily designed to be used in pneumatic tires for bicycles, the object being to produce a simple, compact and convenient valve constructed with particular reference to convenience of application to and removal from the tubular valve-casing; to locating the valve-seat in uniform position therein, and to compressing the seat packing so as to make it peculiarly effective.

With these ends in view my invention consists in certain details of construction and combinations of parts as will be hereinafter described and pointed out in the claims.

In carrying out my invention as herein shown, I employ a valve-seat A, having its inner end formed with an annular bevel $a$, and with a central perforation A' for the reception of the stem B of the valve B', which is provided at the base of the stem with a packing $B^2$, which co-acts with the bevel $a$ of the valve seat. The said valve-seat and valve are located within an externally threaded tubular valve-casing C, which may be of any approved construction, and which is adapted to be applied to a pneumatic tire and a wheel-rim. The said casing is formed with an internal annular shoulder $c$, with which the valve-seat is engaged, and which insures its uniform location in the casing, the outer portion of the bevel $a$ of the seat resting upon the said beveled shoulder. By providing for seating the valve-seat upon a shoulder within the valve-casing, I am enabled to secure a uniform action of the valve, by making the valve-springs D uniform in length. The valve-seat is held in place by means of an exteriorly threaded tubular plug, which is entered into the internally threaded outer end of the casing, the inner end of the said plug impinging against a valve-seat packing F, which is placed against the outer face of the valve-seat. The said plug is formed with a transverse slot $e$, which permits it to be turned into place and withdrawn by means of a screw-driver. It is designed to turn the plug inward so as to impose sufficient pressure upon the packing F, to cause the same to be squeezed outwardly against the inner walls of the casing, so as to form a perfectly tight joint. The stem B of the valve $B^2$ is extended outward through the plug, and upset to form a retaining-head $B^3$, which therefore couples the valve, valve-seat and plug together so that when once assembled they are thereafter handled as one piece, with obvious convenience.

It is apparent that under this construction the valve and valve-seat may be easily withdrawn from the tubular casing by reversely rotating the plug by means of an ordinary screw-driver. I do not limit myself to using my improvement in connection with the particular valve-structure shown and described in which the tubular valve-casing C is provided with a plate-like fender C', a nut $C^2$ which bears upon the wheel-rim, and a removable cap $C^3$ for closing the casing, which is secured to the tire proper by means of a clamping-plate $C^4$, and a nut $C^5$.

In the modified construction shown in Fig. 6, the valve-seat G is formed with a tubular stem G', which is upset within the inner end of the plug H, so that the seat and plug are virtually swiveled together with the valve-seat packing I between them. In this construction the stem J of the valve J' passes through the seat G and its tubular stem, but is not positively connected therewith, so that although the valve seat and the plug are permanently coupled together, the valve and valve-stem are not united to them. In this construction the valve-seat is withdrawn from the casing when the plug is withdrawn, by reversely rotating it, but the valve and valve-stem are left within the casing, from which, however, they may readily be shaken out as there is nothing to bind or restrain them.

In view of the modification suggested, and of others that obviously might be made, I would have it understood that I do not limit myself to the exact construction herein shown and described, but hold myself at liberty to make such changes and alterations as fairly fall within the spirit and scope of my invention.

Having fully described my invention, what I claim as new and desire to secure by Letters Patent is:—

1. In a valve, the combination with a tubular casing formed with an internal shoulder, of a valve-seat bearing upon the said shoulder which locates it properly within the said casing, a plug inserted into the casing for holding the seat in place, a packing interposed between the valve-seat and plug, and a spring-actuated valve co-acting directly with the said valve-seat.

2. In a valve, the combination with a tubular valve casing formed with an internal shoulder, of a spring-actuated valve located within the said casing and provided with a valve-stem, a valve seat located within the casing and seated upon the said shoulder, an externally threaded plug located within the outer end of the casing, which is internally threaded for its reception, and a valve-seat packing introduced between the valve-seat and the plug, and compressed by the plug so as to be forced outward against the walls of the casing.

3. In a valve, the combination with a tubular valve-casing formed with an internal annular beveled shoulder, of a valve-seat formed with a bevel for engaging with the said shoulder which locates it properly within the casing, a plug located within the casing for holding the bevel of the valve-seat against the said beveled shoulder, a packing-washer interposed between the outer end of the valve-seat and the inner end of the plug, and a spring-actuated valve engaging directly with the beveled end of the valve-seat, and formed with a stem extending outward through the said seat and through the said plug, and adapted at its outer end to connect the valve, valve-seat and plug together without interfering with their rotation independent of each other.

4. In a valve, the combination with a tubular valve-casing formed with an internal annular shoulder, of a valve-seat engaging directly with the said shoulder which locates it properly within the said casing, an exteriorly threaded plug located within the casing and having its outer end slotted for the reception of a screw-driver, a packing-washer interposed between the outer end of the valve-seat and the inner end of the plug, and a valve co-acting directly with the valve-seat and provided with a valve-stem which extends outward through the valve-seat and through the plug, and has its outer end upset for connecting the valve, valve-seat and plug together without interfering with their rotation independent of each other.

5. In a valve, the combination with a tubular valve-casing formed with an interior annular shoulder, of a valve located within the said casing, a spring located therein for co-action with the valve, a valve-seat located within the casing, seated upon the shoulder thereof, and formed with a central opening through which the valve-stem projects outwardly, an externally threaded plug located within the internally threaded outer end of the casing, and formed with a passage through which the stem extends outwardly, the outer end of the stem being upset to couple the valve, valve-seat and plug together, and a valve-seat packing interposed between the valve-seat and the plug.

6. For tire and other valves a tubular screw threaded member, a tubular seat member, a ring of packing material, and a stem traversing said parts and connecting them together.

7. For tire and other valves a tubular screw threaded member, a tubular seat member, a ring of packing material adapted to be compressed by said screw threaded member, a valve proper, a stem projecting therefrom, traversing said members and coupling all said parts together.

8. For tire and other valves, a tubular screw threaded plug, in combination with a tubular seat member separate therefrom, and rotative relatively thereto, and a stem traversing said parts and connecting them loosely together.

In testimony whereof, I have signed this specification in the presence of two subscribing witnesses.

JOHN LINES.

Witneses:
M. L. SPERRY,
E. O. GOSS.